(12) United States Patent  
Huang et al.

(10) Patent No.: US 11,842,838 B2  
(45) Date of Patent: Dec. 12, 2023

(54) MAGNETIC COMPONENT

(71) Applicant: Delta Electronics (Shanghai) Co., Ltd., Shanghai (CN)

(72) Inventors: Zhen-Rong Huang, Shanghai (CN); Pei-Ai You, Shanghai (CN); Hao Sun, Shanghai (CN); Hai-Jun Yang, Shanghai (CN); Zeng-Yi Lu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 306 days.

(21) Appl. No.: 17/082,020

(22) Filed: Oct. 28, 2020

(65) Prior Publication Data

US 2021/0043357 A1 Feb. 11, 2021

Related U.S. Application Data

(62) Division of application No. 15/987,896, filed on May 23, 2018, now abandoned.

(30) Foreign Application Priority Data

Jun. 8, 2017 (CN) .......................... 201710427735.6  
Sep. 19, 2017 (CN) .......................... 201710845847.3

(51) Int. Cl.  
*H01F 27/22* (2006.01)  
*H01F 27/24* (2006.01)  
(Continued)

(52) U.S. Cl.  
CPC ........... *H01F 27/22* (2013.01); *H01F 17/043* (2013.01); *H01F 27/022* (2013.01); *H01F 27/16* (2013.01);  
(Continued)

(58) Field of Classification Search  
CPC ...... H01F 27/22; H01F 17/043; H01F 27/022; H01F 27/16; H01F 27/24; H01F 27/2847;  
(Continued)

(56) References Cited

U.S. PATENT DOCUMENTS 5,977,855 A * 11/1999 Matsumura ............. H01F 27/36  
336/205  
6,144,276 A * 11/2000 Booth ................. H01F 27/2876  
336/200  
(Continued)

FOREIGN PATENT DOCUMENTS

CN 202977117 U 6/2013  
CN 204578339 U 8/2015  
(Continued)

*Primary Examiner* — Mang Tin Bik Lian  
(74) *Attorney, Agent, or Firm* — CKC & Partners Co., LLC (57) ABSTRACT

A magnetic component includes a magnetic core and a first winding module. The magnetic core has two opposite openings and at least one magnetic column. The first winding module has a plurality of annular metal plates disposed around the at least one magnetic column. Each of the annular metal plates has an electrical connection end, an annular portion and a heat-dissipating end. The electrical connection end and the heat-dissipation end are located at the two opposite openings of the magnetic core respectively. A thermal-dissipating area of the heat-dissipating end is greater than a cross-sectional area of a connection portion between the heat-dissipating end and the annular portion.

22 Claims, 7 Drawing Sheets

(51) Int. Cl.
*H01F 27/28* (2006.01)
*H02M 1/32* (2007.01)
*H01F 17/04* (2006.01)
*H01F 27/16* (2006.01)
*H01F 27/02* (2006.01)

(52) U.S. Cl.
CPC .......... *H01F 27/24* (2013.01); *H01F 27/2847* (2013.01); *H01F 27/2866* (2013.01); *H01F 27/2876* (2013.01); *H02M 1/32* (2013.01); *H02M 1/327* (2021.05)

(58) Field of Classification Search
CPC ............ H01F 27/2866; H01F 27/2876; H01F 27/325; H01F 2005/043; H01F 2005/046; H01F 2027/297
See application file for complete search history.

(56) References Cited

U.S. PATENT DOCUMENTS

| | | | |
|---|---|---|---|
| 6,522,233 B1 | 2/2003 | Kyoso et al. | |
| 9,349,521 B2 | 5/2016 | Tsai et al. | |
| 9,396,865 B1 | 7/2016 | Folker et al. | |
| 2007/0057757 A1* | 3/2007 | Chen | H01F 27/2866 336/212 |
| 2010/0026437 A1 | 2/2010 | Lin et al. | |
| 2010/0117780 A1* | 5/2010 | Hsieh | H01F 27/2852 336/222 |
| 2011/0115598 A1* | 5/2011 | Wu | H01F 27/325 336/212 |
| 2011/0221558 A1* | 9/2011 | Yeh | H01F 27/2847 336/192 |
| 2012/0257419 A1* | 10/2012 | Kaneko | H01F 27/306 336/198 |
| 2013/0002390 A1* | 1/2013 | Nam | H01F 27/325 336/207 |
| 2014/0184378 A1 | 7/2014 | Wild | |
| 2014/0266530 A1 | 9/2014 | Andres et al. | |
| 2014/0327511 A1 | 11/2014 | Tsai et al. | |
| 2015/0318098 A1* | 11/2015 | Miyamoto | H01F 30/00 336/183 |
| 2016/0133379 A1 | 5/2016 | Lin et al. | |

FOREIGN PATENT DOCUMENTS

| | | |
|---|---|---|
| CN | 205230763 U | 5/2016 |
| CN | 205670491 U | 11/2016 |
| CN | 207165344 U | 3/2018 |
| JP | H11233979 A | 8/1999 |
| JP | 2004303823 A | 10/2004 |
| KR | 101199586 B1 | 11/2012 |
| TW | 201118895 A | 6/2011 |
| TW | 201239921 A | 10/2012 |
| TW | 201324552 A | 6/2013 |
| TW | 201501141 A | 1/2015 |

\* cited by examiner

MAGNETIC COMPONENT

CROSS-REFERENCE TO RELATED APPLICATION

This application is a Divisional Application of Non-provisional application Ser. No. 15/987,896, filed May 23, 2018, which claims priority to China Application Serial Number 201710427735.6, filed Jun. 8, 2017 and 201710845847.3, filed Sep. 19, 2017 which are herein incorporated by reference in their entireties.

BACKGROUND

Field of Invention

The present invention relates to a magnetic component and, more particularly, to a magnetic component implemented in an automotive power supply.

Description of Related Art

The thermal design of the power supply module has been one of the key considerations for power supply manufacturers, especially in the high-power supply module. Once the power supply module's temperature increases, the power conversion efficiency will reduce, or even break down the devices, cause a fire and so on.

In recent years, due to the rise of environmental awareness, oil and electricity hybrid or pure electric vehicle market are gradually increased, the power supply module applied in the vehicles needs higher power conversion efficiencies, and the overall module volume must be controlled within a predetermined limit.

How to improve the cooling efficiency of the power supply module in a limited volume, and contribute to the improvement of power conversion efficiency, still needs more efforts.

SUMMARY

In one or more embodiments, a magnetic component includes a magnetic core and a first winding module. The magnetic core has two opposite openings and at least one magnetic column. The first winding module has a plurality of annular metal plates disposed around the at least one magnetic column. Each of the annular metal plates has an electrical connection end, an annular portion and a heat-dissipating end. The electrical connection end and the heat-dissipation end are located at the two opposite openings of the magnetic core respectively. A thermal-contact area of the heat-dissipating end is greater than a cross-sectional area of a connection portion between the heat-dissipating end and the annular portion.

In one or more embodiments, a cross-section of the heat-dissipating end and a part of the annular portion collectively define an L-shaped cross-section.

In one or more embodiments, a cross-section of the heat-dissipating end and a part of the annular portion collectively define a T-shaped cross-section.

In one or more embodiments, the heat-dissipating end of each annular metal plate protrudes out of the aligned one of the two opposite openings.

In one or more embodiments, a total sum of the thermal-contact areas of the first winding module is greater than or equal to an area of the aligned one of the two opposite openings.

In one or more embodiments, the heat-dissipating ends of the annular metal plates are electrically spaced from each other.

In one or more embodiments, each electrical connection end has an anti-extraction barb structure, which engages the printed circuit board.

In one or more embodiments, each annular metal plate is a single coil of circuit.

In one or more embodiments, at least part of the annular metal plates are electrically coupled with one another to form multiple coils of circuit.

In one or more embodiments, each annular metal plate is an annular copper plate.

In one or more embodiments, the magnetic core has an inner chamber within which a thermal resin is filled.

In one or more embodiments, each electrical connection end has a protrusion portion that has a height.

In one or more embodiments, the magnetic component further includes a second winding module, wherein the second winding module includes a plurality of bobbins, the annular metal plates and the bobbins are alternately disposed within the magnetic core, wherein the second winding module further includes a plurality of coil wires wound around each of the bobbins.

In one or more embodiments, each bobbin has a plurality of wire management slots arranged symmetrically.

In one or more embodiments, each bobbin has a convex position block, the electrical connection end of each annular metal plate has a cutout section, and the convex position block engages the cutout section when the bobbins and the annular metal plates are assembled within the magnetic core.

In one or more embodiments, the coil wires constitute three stacked layers of wires.

In one or more embodiments, each coil wire has an end that is led through corresponding ones of the wire management slots and electrically connected to a lead terminal.

In one or more embodiments, the magnetic component is an electric transformer.

In one or more embodiments, an automotive power supply includes a water-cooling metal block and a magnetic component. The water-cooling metal block has concave portion. The magnetic component is installed within the concave portion. The heat-dissipating end of each annular metal plate thermally contacts the water-cooling metal block.

In one or more embodiments, the automotive power supply further includes a first printed circuit board coupled with the electrical connection end of each annular metal plate.

In one or more embodiments, the automotive power supply further includes a second printed circuit board coupled with the heat-dissipating end of each annular metal plate.

In sum, the magnetic component as discussed herein modify the heat-dissipating end of the annular metal plate to have an enlarged thermal dissipation area such that more areas can be applied with heat pastes. When the magnetic component is implemented on a high-power automotive power supply, the heat-dissipation ability of the winding module can be effectively risen by utilizing larger thermal dissipation area to dissipate heat with the water-cooling metal block such that a compact automotive power supply with high reliability and good heat dissipation effect can be achieved.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

An aspect of the present disclosure is to provide a magnetic component utilized in an automotive power supply. The magnetic component within the automotive power supply occupies a larger volume, weight, and is also one of the main heat-generating elements. The present disclosure will enhance its heat-dissipating capacity as well as optimizing its power conversion efficiency.

Figure 1:
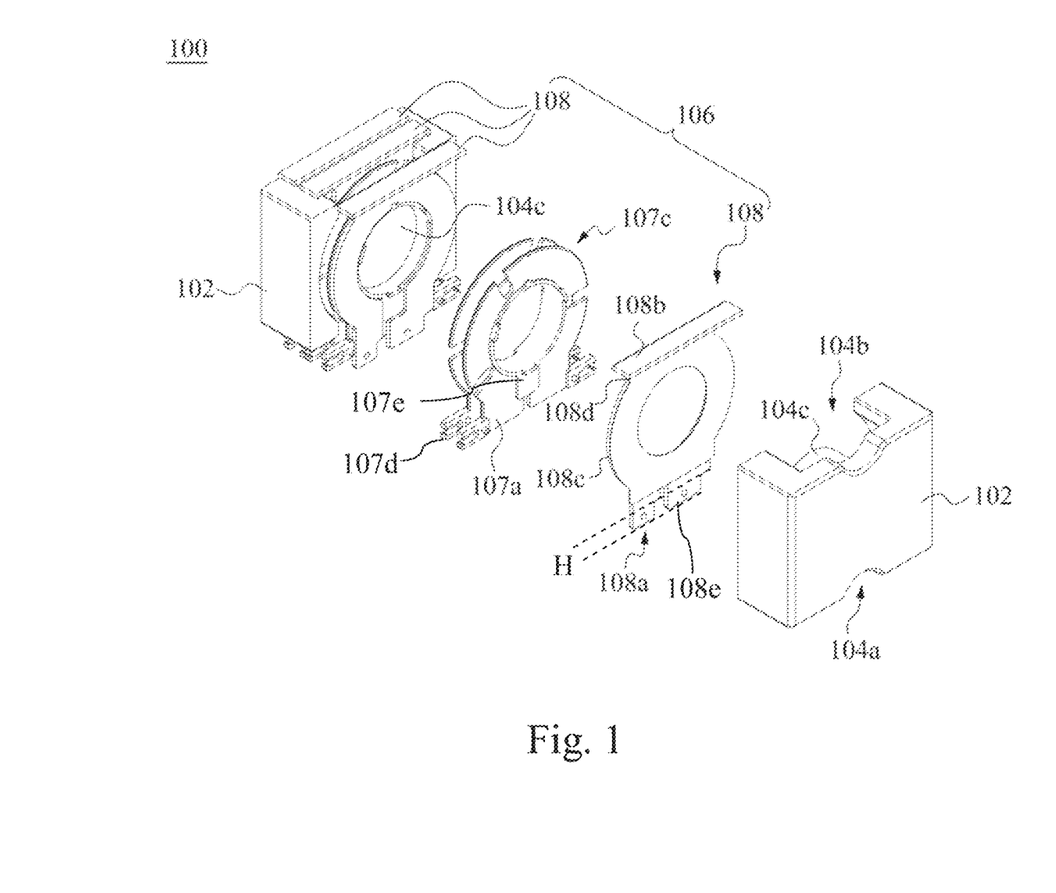
FIG. 1 illustrates an exploded view of a magnetic component according to one embodiment of the present disclosure.

FIG. 1 illustrates an exploded view of a magnetic component 100 according to one embodiment of the present disclosure. The magnetic component 100 includes a magnetic core 102, a first winding module 106 and a second winding module 107 (also referring to FIG. 4). The magnetic core 102 includes two opposite openings (104a, 104b) and at least one magnetic column 104c. In this embodiment, the magnetic core 102 consists of two half magnetic cores in mirror symmetry, but not being limited to. In this embodiment, the magnetic core 102 may be iron oxide mixtures, such as manganese-zinc ferrite, but other metal oxide materials can also be applied on demand without limitation.

The first winding module 106 includes multiple annular metal plates 108 that are inserted through by the magnetic column 104c. Each annular metal plate 108 includes an electrical connection end 108a, an annular portion 108c and a heat-dissipating end 108b. The electrical connection end 108a and the heat-dissipating end 108b are located at (or aligned with) the two opposite openings (104a, 104b) of the magnetic core 102 after the magnetic component is assembled. A thermal-dissipation area of the heat-dissipating end 108b is greater than a cross-sectional area of a connection portion 108d between the heat-dissipating end 108b and the annular portion 108c such that more thermal dissipation area can be applied with heat paste. In this embodiment, the magnetic component 100 can be an electric transformer, the first winding module 106 can be a secondary winding of the electric transformer, and the second winding module 107 can be a primary winding of the electric transformer.

In this embodiment, the electrical connection end 108a has a protrusion portion 108e that has a height H. The protrusion portion 108e is used to inserted into a printed circuit board, and the height H may be varied to control an insulating gap between the heat-dissipating end 108b and a bottom surface of a concave portion 126 (referring to FIG. 8).

In this embodiment, each annular metal plate 108 can be a single coil of circuit, but the annular metal plates 108 can also be electrically coupled with one another to form multiple coils of circuit.

In this embodiment, each annular metal plate 108 can be an annular copper plate applied in the low-voltage high-current automotive applications, but other metal materials can also be applied according to actual demands.

In this embodiment, a total sum of the thermal dissipation areas (at the heat-dissipating ends 108b) of the first winding module 106 is greater than or equal to an area of the corresponding opening 104b of the magnetic core 102 to assure a greater thermal dissipation area and the heat-dissipating end 108b protruded out of the opening 104b.

Figure 2:
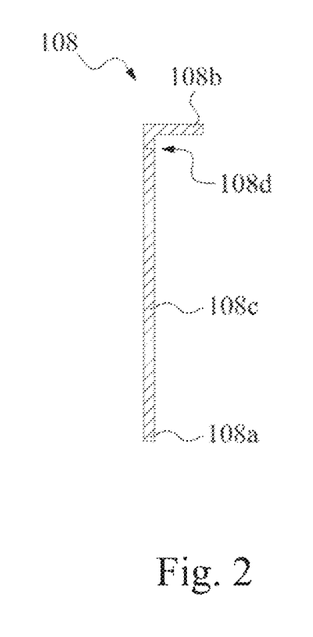
FIG. 2 illustrates a cross-sectional view of an annular metal plate in FIG. 1.
Figure 3:
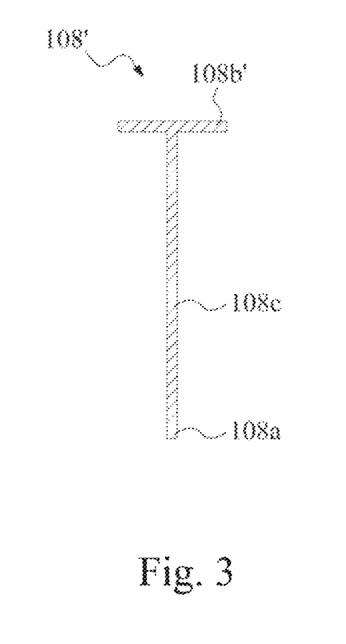
FIG. 3 illustrates a cross-sectional view of an annular metal plate according to another embodiment of the present disclosure.

Reference is made to FIG. 2 and FIG. 3. FIG. 2 illustrates a cross-sectional view of an annular metal plate in FIG. 1, and FIG. 3 illustrates a cross-sectional view of an annular metal plate according to another embodiment of the present disclosure. As illustrated in FIG. 2, a cross-section of the heat-dissipating end 108b and a cross-section of the annular portion 108c collectively define an L-shaped cross-section. The L-shaped cross-section is formed by bending the heat-dissipating end 108b or other mold-manufactured to enlarge the thermal dissipation area. However, the cross-section of the heat-dissipating end 108b and the cross-section of the annular portion 108c is not limited to form an L-shape, and any shapes capable of enlarging the thermal dissipation area are applicable. For example, as illustrated in FIG. 3, a cross-section of the heat-dissipating end 108b' and a cross-section of the annular portion 108c of the annular metal plate 108' collectively define a T-shaped cross-section.

In this embodiment, the heat-dissipating end 108b of the annular metal plate 108 protrudes out of the corresponding opening 104b to be in thermal contact with a heat-dissipating device, e.g., a metallic water-cooling block. The electrical connection end 108a of the annular metal plate 108 also protrudes out of the corresponding opening 104a to be electrically coupled with a printed circuit board.

Figure 4:
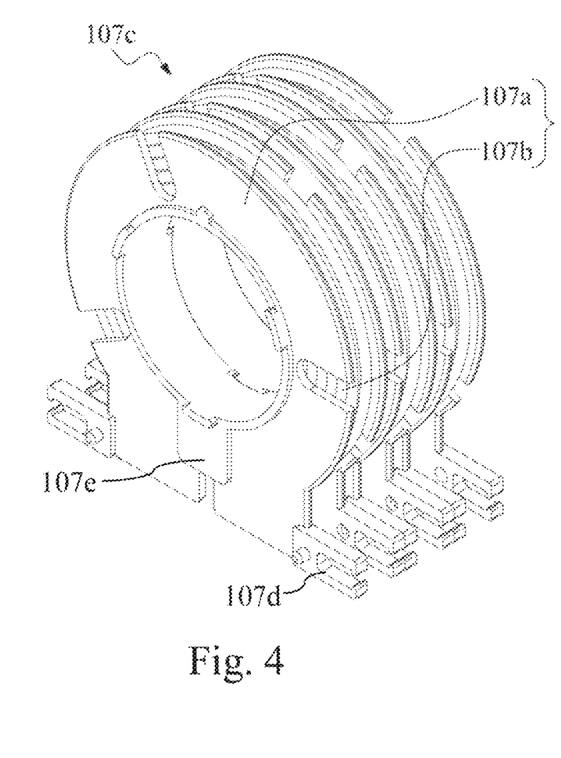
FIG. 4 illustrates a perspective view of a second winding module in FIG. 1.
Figure 10:
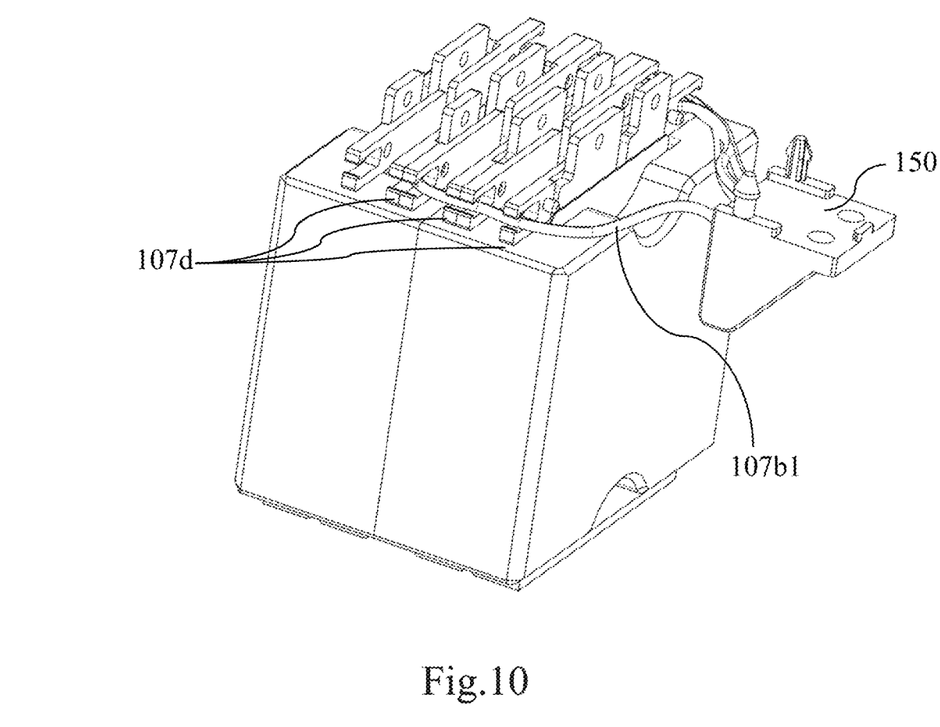
FIG. 10 illustrates a perspective view to show a coil wire of the magnetic component being coupled to a lead terminal according to one embodiment of the present disclosure.

Reference is made to FIG. 4 and FIG. 10. FIG. 4 illustrates a perspective view of a second winding module in FIG. 1. FIG. 10 illustrates a perspective view to show a coil wire of the magnetic component being coupled to a lead terminal according to one embodiment of the present disclosure. The second winding module 107 includes multiple bobbins 107a, and the annular metal plates 108 and the bobbins 107a are alternately arranged within an inner chamber of the magnetic core 102. The second winding module 107 includes multiple coil wires 107b wound within a coil cavity 107c of each bobbin 107a. In this embodiment, the coil wires 107b are three layers insulated wires (electrically-conductive wire with insulated sheath). The bobbin 107a is made from electrical insulating materials such that the annular metal plates 108 can be electrical insulated by the bobbins 107a after they are assembled within the magnetic core 102. When the magnetic component 100 serves as a transformer, a quantity and turns of the coil wires 107b and the annular metal plates 108 can be varied to achieve a desired voltage according to actual demands. In this embodiment, each bobbin 107a also has a plurality of wire management slots 107d arranged symmetrically. The coil wires 107b have their ends 107b1 led through corresponding ones of the wire management slots 107d and electrically connected to a lead terminal 150.

In this embodiment, each bobbin 107a has a convex position block 107e, and the electrical connection end 108a has a notch 108f, and the convex position block 107e engages the notch 108f when the bobbins 107a and the annular metal plates 108 are assembled within the magnetic core 102.

Figures 5, 6:
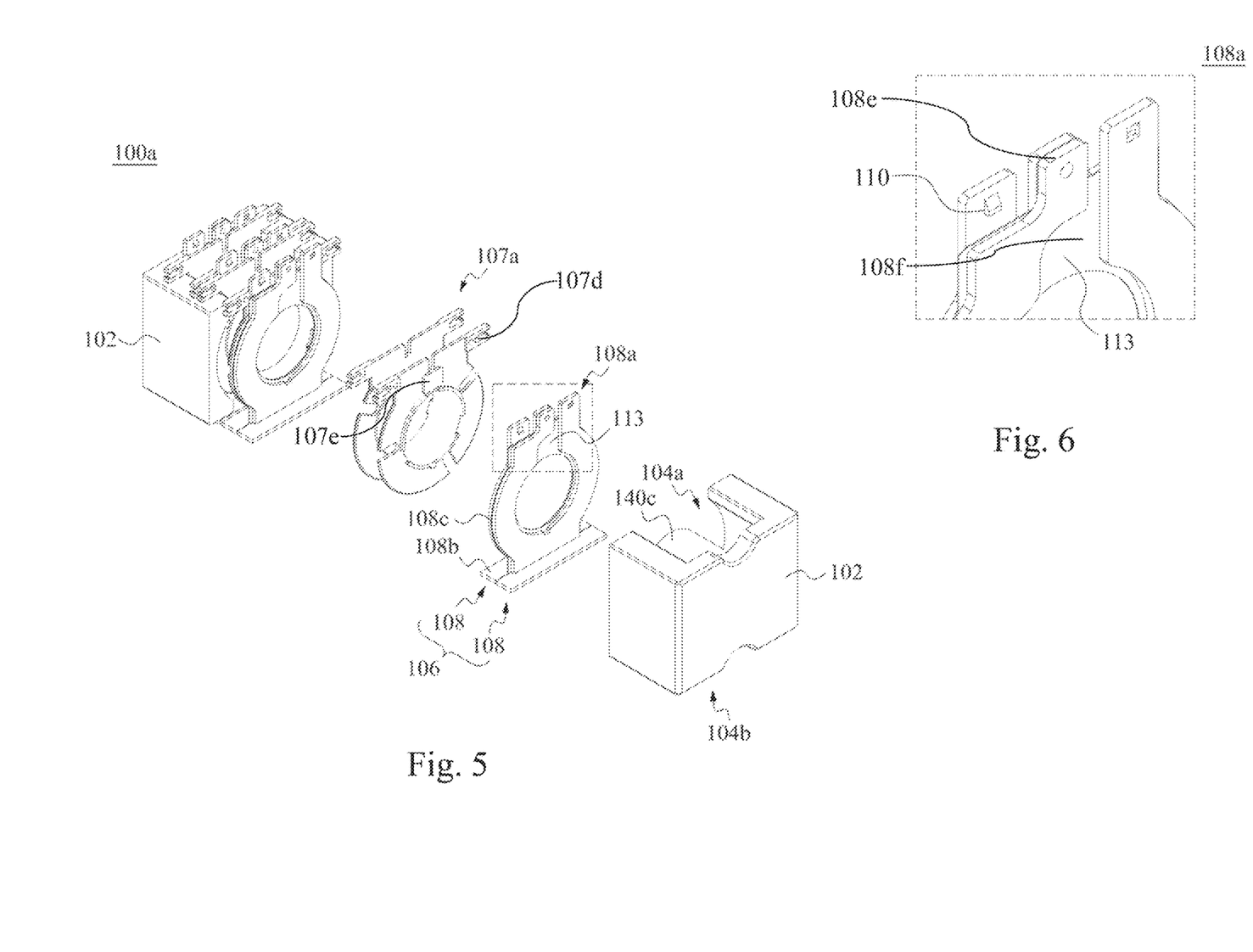
FIG. 5 illustrates an exploded view of a magnetic component according to another embodiment of the present disclosure.
FIG. 6 illustrates an enlarged view of the heat-dissipation end in FIG. 5.

Reference is made to FIG. 5. FIG. 5 illustrates an exploded view of a magnetic component according to another embodiment of the present disclosure. The magnetic component 100a is different from the magnetic component 100 in that each coil of the magnetic component comprises two turns constituted by two annular metal plates 108. In particular, two annular metal plates 108 are overlapped and insulated by an insulation sheet 113. When each coil of the magnetic component comprises two turns constituted by two annular metal plates 108, each heat-dissipating end 108b has a smaller thermal dissipation area, i.e., compared with the thermal dissipation area of the annular metal plate 108 in FIG. 1, the heat-dissipating ends 108b are electrically insulated, e.g. by the insulation sheet 113. FIG. 5 only illustrates each coil of the magnetic component comprises two turns constituted by two annular metal plates 108, but the coil of the magnetic component may comprise more turns constituted by the annular metal plates 108.

Reference is made to FIG. 6. FIG. 6 illustrates an enlarged view of the heat-dissipation end 108a in FIG. 5. Each electrical connection ends of the two annular metal plates 108 has a barb structure 110 that has an anti-extraction functionality. The two barb structures 110 of the two annular metal plates 108 faces away from each other and not overlapped or aligned in position. In this embodiment, the barb structure 110 is formed by punching onto one surface of the annular metal plate 108 to form a convex portion on an opposite surface of the annular metal plate 108, but the manufacturing method is not limited to this way. The barb structure 110 is configured to engage inside the printed circuit board to prevent from easy extraction.

Figure 7:
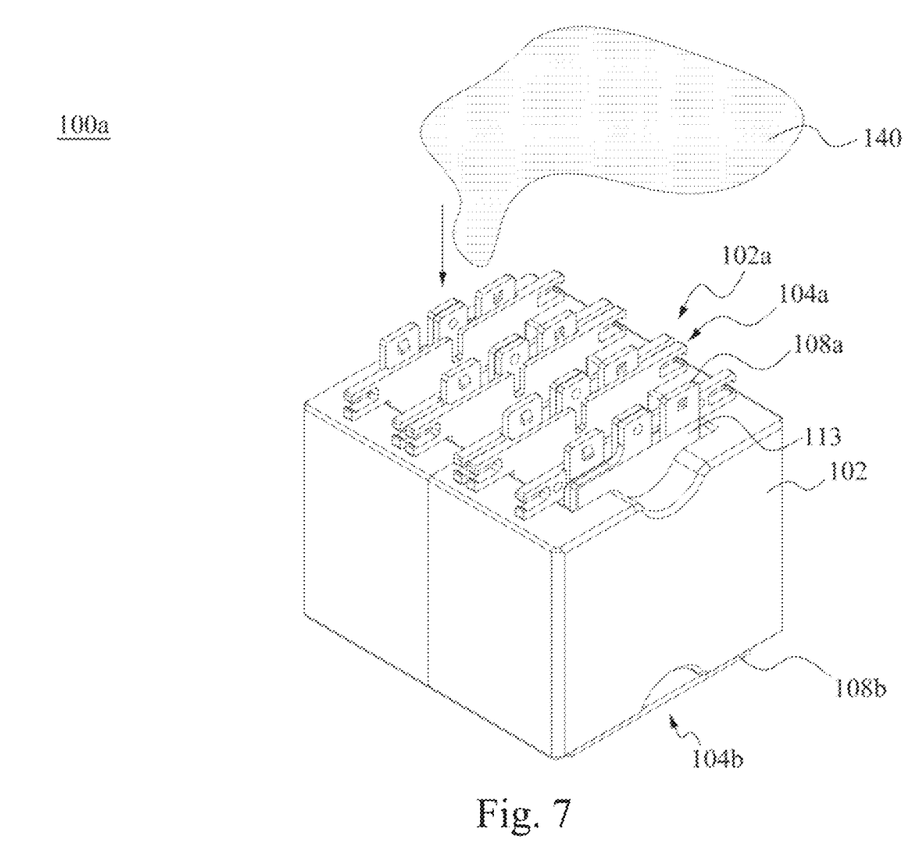
FIG. 7 illustrates an assembled view of the magnetic component according to still another embodiment of the present disclosure.

Reference is made to FIG. 7. FIG. 7 illustrates an assembled view of the magnetic component 100a in FIG. 5. When the first winding module 106 and the second winding module 107 are alternately arranged (as illustrated in FIG. 4) and assembled, and installed into an inner chamber 102a of the magnetic core 102 as illustrated in FIG. 7. In this embodiment, the magnetic component may have a thermal resin 140 filled into the inner chamber 102a of the magnetic core 102, so as to fill into all air gaps among the first winding module 106 and the second winding module 107, thereby enhancing the heat-dissipating efficiency of the first winding module 106 and the second winding module 107. After the magnetic component is assembled, the heat-dissipating end 108b protrudes out of the corresponding opening 104b to be thermal contact with a heat-dissipating device, e.g., a water-cooling metal block, while the electrical connection end 108a also protrudes out of the corresponding opening 104a to be coupled with a printed circuit board.

Figure 8:
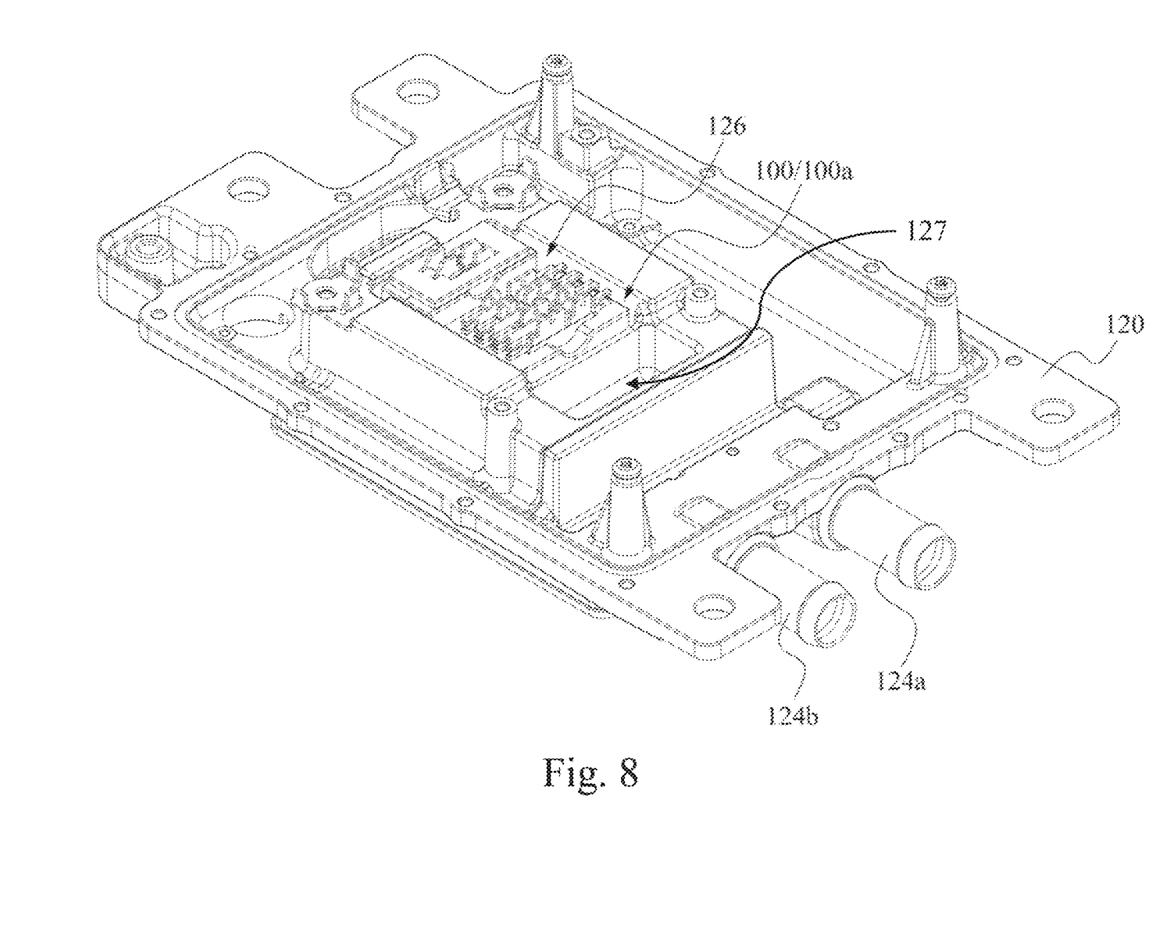
FIG. 8 illustrates an assembled view of the magnetic component coupled to a water-cooling metal block according to another embodiment of the present disclosure.

Reference is made to FIG. 8 and FIG. 10. FIG. 8 illustrates an assembled view of the magnetic component coupled to a water-cooling metal block according to another embodiment of the present disclosure. When all components of the magnetic component (100a or 100) are assembled, the heat-dissipating end 108b is used to thermally contact a water-cooling metal block 120. In this embodiment, the water-cooling metal block 120 has a liquid-cooling circulation passage inside thereof, and a water-cooling liquid is circulated through an inlet 124a and an outlet 124b. The water-cooling metal block 120 also has a concave portion 126 to accommodate the magnetic component (100a or 100), and the heat-dissipating end 108b of the magnetic component (100a or 100) is in thermal contact with a bottom surface of the concave portion 126. In another embodiment, the concave portion 126 may also be filled with a thermal resin, e.g., between the heat-dissipating end 108b and the bottom surface of the concave portion 126. In this embodiment, each bobbin 107a also has a plurality of wire management slots 107d arranged symmetrically. The coil wires 107b have their ends 107b1 led through corresponding ones of the wire management slots 107d and electrically connected to a lead terminal 150. The lead terminal 150 is accommodated in another concave portion 127 adjacent to a side of the magnetic component (100a or 100).

Figure 9:
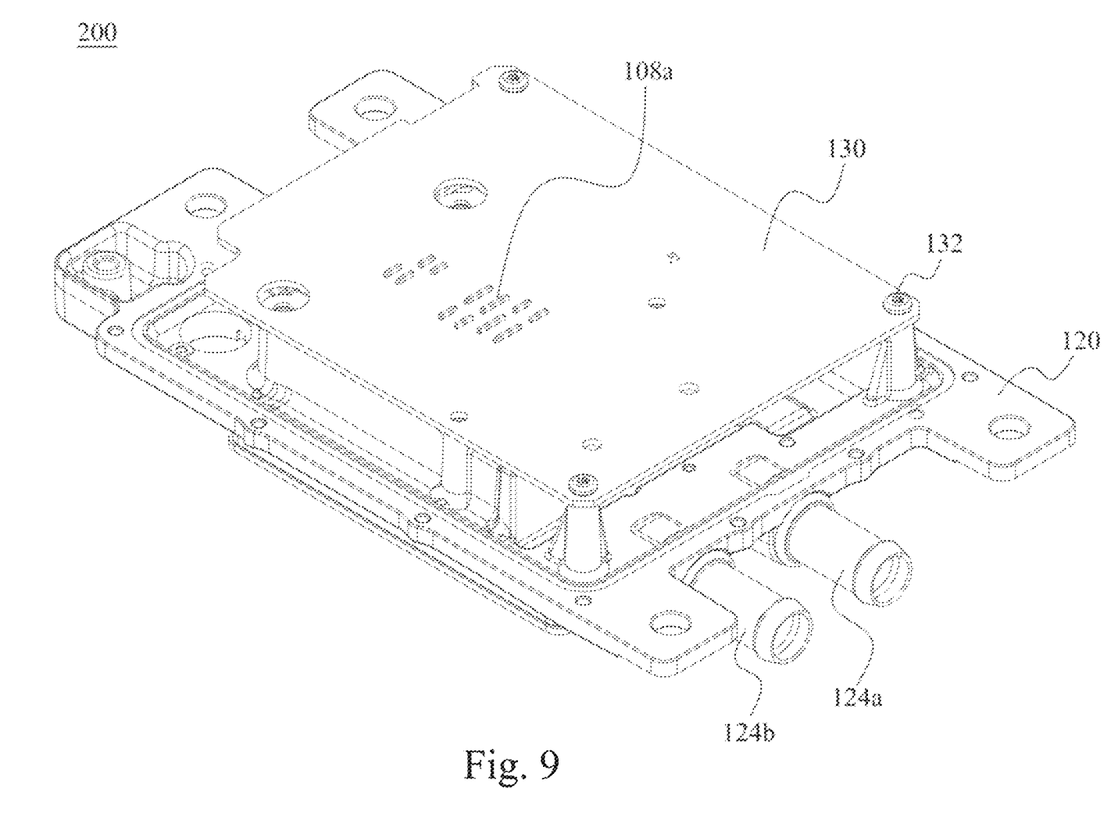
FIG. 9 illustrates an assembled view of an automotive power supply according to one embodiment of the present disclosure.

Reference is made to FIG. 9. FIG. 9 illustrates an assembled view of an automotive power supply 200 according to one embodiment of the present disclosure. After the magnetic component (100a or 100) is assemble to the water-cooling metal block 120 and other associated electronic components are installed, a printed circuit board 130 can be attached upon. And the electrical connection end 108a of the magnetic component (100a or 100) is inserted into a connection hole of the printed circuit board 130, and fasteners 132, e.g., screws, are used to secure the printed circuit board 130 to the water-cooling metal block 120 and the magnetic component (100a or 100). The height H of the protrusion portion 108e may be varied to control an insulating gap between the heat-dissipating end 108b and a bottom surface of the concave portion 126 (referring to FIG. 8).

As discussed above, the annular metal plate 108 of the magnetic component (100a or 100) has its electrical connection end for an electrical coupling function and its heat-dissipating end for a thermal dissipation function. However, the heat-dissipating end of the annular metal plate may be used both for the electrical coupling function and the thermal dissipation function. For example, the heat-dissipating end of the annular metal plate, e.g., the heat-dissipating end 108b, is coupled to a printed circuit board equipped with excellent heat-dissipating efficiency, e.g., the printed circuit board equipped with heat-dissipating fins. The thermal dissipation area at heat-dissipating end is expanded to improve thermal performance and the heat-dissipating end also serves as an electrical connection interface to the printed circuit board.

In sum, the magnetic component as discussed herein modify the heat-dissipating end of the annular metal plate to have a larger thermal dissipation area such that more areas can be applied with heat pastes. When the magnetic component is implemented on a high-power automotive power supply, the heat-dissipation efficiency of the winding module can be effectively solved by utilizing larger thermal dissipation area to dissipate heat to the water-cooling metal block such that a compact automotive power supply with high reliability and good heat dissipation can be achieved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A magnetic component comprising:
   a magnetic core having two opposite openings and at least one magnetic column; and
   a first winding module having a plurality of annular metal plates that are inserted around the at least one magnetic column, wherein each annular metal plate has an electrical connection end, an annular portion, and a heat-dissipating end, the heat-dissipation end is aligned with a corresponding one of the two opposite openings of the magnetic core, a thermal dissipation area of the heat-dissipating end is greater than a cross-sectional area of a connection portion between the heat-dissipating end and the annular portion, wherein the magnetic core has an inner chamber within which a thermal resin is filled, wherein the heat-dissipation end is in contact with a surrounding portion of the magnetic core that defines the corresponding one of the two opposite openings.

2. The magnetic component of claim 1, wherein a cross-section of the heat-dissipating end and the annular portion collectively define an L-shaped cross-section.

3. The magnetic component of claim 1, wherein a cross-section of the heat-dissipating end and the annular portion collectively define a T-shaped cross-section.

4. The magnetic component of claim 1, wherein the heat-dissipating end of each annular metal plate protrudes out of the corresponding one of the two opposite openings.

5. The magnetic component of claim 1, wherein a total sum of the thermal dissipation areas of the first winding module is greater than an area of the corresponding one of the two opposite openings.

6. The magnetic component of claim 1, wherein the heat-dissipating ends of the annular metal plates are spaced from each other.

7. The magnetic component of claim 1, wherein each electrical connection end has a barb structure, which engages a printed circuit board.

8. The magnetic component of claim 1, wherein each annular metal plate is a single coil of circuit.

9. The magnetic component of claim 1, wherein at least part of the annular metal plates are electrically coupled with one another to form multiple coils of circuit.

10. The magnetic component of claim 1, wherein each annular metal plate is an annular copper plate.

11. The magnetic component of claim 1, wherein each electrical connection end has a protrusion portion that has a height.

12. The magnetic component of claim 1 further comprising a second winding module, wherein the second winding module comprises a plurality of bobbins, the annular metal plates and the bobbins are alternately disposed within the magnetic core, wherein the second winding module further comprises a plurality of coil wires wound around each of the bobbins.

13. The magnetic component of claim 12, wherein each bobbin has a plurality of wire management slots arranged symmetrically.

14. The magnetic component of claim 12, wherein each bobbin has a convex position block, the electrical connection end of each annular metal plate has a notch, the convex position block engages the notch when the bobbins and the annular metal plates are assembled within the magnetic core.

15. The magnetic component of claim 12, wherein the coil wires constitute three layers insulated wires.

16. The magnetic component of claim 13, wherein each coil wire has an end that is led through corresponding ones of the wire management slots and electrically connected to a lead terminal.

17. The magnetic component of claim 13, wherein the magnetic component is a transformer.

18. An automotive power supply comprising:
    a water-cooling metal block having a concave portion; and
    the magnetic component of claim 1 installed within the concave portion, and the heat-dissipating end of each annular metal plate thermally contacting the water-cooling metal block.

19. The automotive power supply of claim 18 further comprising a first printed circuit board coupled with the electrical connection end of each annular metal plate.

20. The automotive power supply of claim 18 further comprising a second printed circuit board coupled with the heat-dissipating end of each annular metal plate.

21. The magnetic component of claim 1, wherein the heat-dissipation end and the electrical connection end are aligned with the two opposite openings of the magnetic core respectively.

22. The magnetic component of claim 1, wherein the annular portion extends in a first plane, the heat-dissipating end extends in a second plane, the first plane is perpendicular to the second plane.

* * * * *